(12) United States Patent
Fryfogle et al.

(10) Patent No.: US 11,753,555 B2
(45) Date of Patent: Sep. 12, 2023

(54) SOLVENT STABLE SLIP ADDITIVE COMPOSITION WITH MONOTERPENE

(71) Applicants: Dow Silicones Corporation, Midland, MI (US); Rohm and Haas Company, Collegeville, PA (US)

(72) Inventors: Patrick J. Fryfogle, Midland, MI (US); Julie Cook, Midland, MI (US); Tim Mitchell, Midland, MI (US); Yihan Liu, Midland, MI (US); Rebecca Beeson, Midland, MI (US); Miroslav Janco, Collegeville, PA (US); Mikayla T. Miller, Midland, MI (US); Brad J. Phillips, Midland, MI (US)

(73) Assignees: DOW SILICONES CORPORATION, Midland, MI (US); ROHM AND HAAS COMPANY, Collegeville, PA (US)

( * ) Notice: Subject to any disclaimer, the term of this patent is extended or adjusted under 35 U.S.C. 154(b) by 0 days.

(21) Appl. No.: 18/005,062

(22) PCT Filed: Oct. 11, 2021

(86) PCT No.: PCT/US2021/054341
§ 371 (c)(1),
(2) Date: Jan. 11, 2023

(87) PCT Pub. No.: WO2022/103537
PCT Pub. Date: May 19, 2022

(65) Prior Publication Data
US 2023/0242775 A1    Aug. 3, 2023

Related U.S. Application Data

(60) Provisional application No. 63/107,246, filed on Oct. 29, 2020.

(51) Int. Cl.
C09D 7/65 (2018.01)
C09D 7/20 (2018.01)
(Continued)

(52) U.S. Cl.
CPC .................. C09D 7/65 (2018.01); C09D 4/06 (2013.01); C09D 145/00 (2013.01)

(58) Field of Classification Search
CPC .................................... C09D 7/20; C09D 7/65
See application file for complete search history.

(56) References Cited

U.S. PATENT DOCUMENTS

| 2,676,182 A | 4/1954 | Daudt et al. |
| 3,627,851 A | 12/1971 | Brady |

(Continued)

FOREIGN PATENT DOCUMENTS

| WO | 2012018750 | 2/2012 |
| WO | 2016014609 | 1/2016 |

OTHER PUBLICATIONS

"Citrus-Based Solvents replace Xylene products", Industry Insights, 2014.
(Continued)

Primary Examiner — Vu A Nguyen
(74) Attorney, Agent, or Firm — Steven W. Mork (57) ABSTRACT

A dispersion contains: (a) a polyorganosiloxane with at least 90 mole % dimethyl D units and viscosity of one kPa*s or more dispersed as 0.5-20 micrometer particles; (b) a condensation product of: (i) a polysiloxane resin (Mw of 4,000-50,000) with composition: $(R_3SiO_{1/2})_a(SiO_{4/2})_b(ZO_{1/2})_c$ where a is 0.30-0.60, b is 0.40-0.70, c is 0.05-0.20, a+b is one, R is selected from hydrogen, $C_{1-30}$ alkyl groups and aryl groups, and Z is selected from H, and $C_{18}$ alkyls; and (ii) a polyoxyalkylene polymer (Mn of 4,500-50,000) with composition: $A-O-(C_2H_4O)_e(C_3H_6O)_p-A'$ where e/p is (Continued)

1-9, A and A' are selected from hydrogen, alkyl, substituted alkyl, aryl, and substituted aryl groups and at least one of A and A' is H; (c) non-aqueous fluid carrier miscible with (a); and (d) monoterpene; the weight-ratio of (c) to (b) is 0.5-1; weight-ratio of (b) and (c) to (a) is 0.01-0.50; and the composition contains below one ppm aromatic solvent.

10 Claims, 2 Drawing Sheets

(51) Int. Cl.
    *C09D 183/06* (2006.01)
    *C09D 4/06* (2006.01)
    *C09D 145/00* (2006.01)

(56) References Cited

U.S. PATENT DOCUMENTS

| | | |
|---|---|---|
| 3,772,247 A | 11/1973 | Flannigan |
| 4,125,470 A | 11/1978 | Fenton et al. |
| 5,548,053 A | 8/1996 | Weidner et al. |
| 8,017,712 B2 | 9/2011 | Berry et al. |
| 8,877,293 B2 | 11/2014 | Evans et al. |

OTHER PUBLICATIONS

Filly, "Extraction of aroma compounds in blackcurrant buds by alternative solvents: Theoretical and experimental solubility study", C.R. Chimie, 2014, vol. 17, pp. 1268-1275.

Kulkarni, "Selective extraction of natural products with benign solvents and recovery by organophilic pervaporation: fraction of D-limonene from orange peels", Green Chem., 2010, vol. 12, pp. 1990-1994.

Langman, "D-Limonene: Is It a Safe, Effective Alternative to Xylene?", Journal of Histotechnology, 1995, vol. 18, is. 2, pp. 131-137.

Molhave, "The Eye Irritation and Odor Potencies of Four Terpenes which are Major Constituents of the Emissions of VOCs from Nordic Soft Woods", Indoor Air, 2000, vol. 10, pp. 315-318.

Serra, "Fabrication of polymer-based micro devices: Formulation and study of the paste", Sensors and Actuators A: Physical, 2011, vol. 172, pp. 336-340.

Smith, "The Analytical Chemistry of Silicones", John Wiley & Sons, 1991, vol. 112, pp. 347.

Tamura, "The Volatile Constituents in the Peel and Pulp of a Green Thai Mango, Khieo Sawoei Cultivar", Food Sci. Technol. Res., 2001, vol. 7, No. 1, pp. 72-77.

SOLVENT STABLE SLIP ADDITIVE COMPOSITION WITH MONOTERPENE

FIELD OF THE INVENTION

The present invention relates to a slip additive composition that comprises a polysiloxane gum dispersed in a carrier fluid and the preparation of such a slip additive composition using a monoterpene reaction solvent.

INTRODUCTION

Slip additives are commonly used in coatings to provide mar resistance properties to the coating. Slip additives reduce the coefficient of friction between objects and the surface of a coating. A lower coefficient of friction between an object sliding over the surface of a coating desirably enable the object to slide more freely over the surface resulting in less undesirable effects such as marring and blocking (which results in squeaking as the object slides).

One type of slip additive, and the type that is the subject of the present invention, is a dispersion of polysiloxane gum in a carrier fluid. Such slip additives desirably are stable in aqueous coating formulations, and more desirably are also stable in the presence of organic solvents such as coalescing aids that are often present in coating formulations. "Stable" refers to stable as a dispersion in that the dispersed phase does not readily phase separate from the carrier phase. If a slip additive is not stable in a coating formulation phase separation occurs, causing loss of formulation homogeneity. Homogeneity is necessary for an attractive coating. "Slip additive" as used hereinafter refers to slip additives that are dispersions of polysiloxane gum in a carrier fluid.

There is a movement to reduce the amount of aromatic solvents in coating formulations. Aromatic solvents such as benzene, ethyl benzene, toluene and xylene are often used in synthesizing organic and silicone compounds and are carried over to resulting coating formulations with those compounds as impurities in the coating components. During the synthesis of the organic and silicone compounds, aromatic solvents are desirable to enhance solubility of components and drive out water under a solvent reflux condition to enhance efficiency of the reaction. Aromatic solvents are also useful during drying of a coating and to induce coalescence of coating components. However, the industry would like to reduce the use of aromatic solvents for environmental reasons. Removing aromatic solvents from slip additive compositions once they are present is not easy. Therefore, reducing the amount of aromatic solvent in a slip additive requires identifying how to form the slip additive with little or no aromatic solvent.

A slip additive that is stable in an aqueous coating formulation and in the presence of organic solvents while at the same time contains less than one weight part aromatic solvent per million weight parts slip additive would advance the art and be desirable to the coating industry.

BRIEF SUMMARY OF THE INVENTION

The present invention provides a slip additive that is stable in an aqueous coating formulation and in the presence of organic solvents while at the same time contains less than one weight part aromatic solvent per million weight parts slip additive.

The present invention is a result of surprisingly discovering that: (a) a polyoxyalkylene functionalized MQ resin emulsifier system can be prepared in a monoterpene reaction solvent, and the functionalized MQ resin emulsifier system can contain less than 5 weight parts aromatic solvent per million weight parts polyoxyalkylene functionalized MQ resin reaction product; and (b) such a polyoxyalkylene functionalized MQ resin emulsifier system can suitably disperse polyorganosiloxane gum to particle sizes of 0.5 to 20 micrometers in a polar medium to form a slip additive composition that is stable in the presence of water and organic solvent and that contains less than one weight part aromatic solvent per million weight parts composition.

At the same time, it has surprisingly been discovered that monoterpenes can be used as a condensation reaction solvent for a condensation reaction for producing the polyoxyalkylene functionalized MQ resins emulsifier system. This discovery is particularly surprising in light of the fact that the reactants have minimal co-solubility in monoterpenes. It has also been discovered that the condensation reaction product acts as a solubility enhancer for the reactants in monoterpene so as the reaction proceeds the remaining reactants become increasingly soluble in the monoterpene. This phenomenon is not evident with aromatic reaction solvents or other known reaction solvents. The condensation reaction can be run in monoterpene reaction solvent using reactant (polysiloxane resin and polyoxyalkylene polymer) concentrations greater than 10 weight-percent based on weight of reactants and monoterpene reaction solvent.

The monoterpene reaction solvent can facilitate removal of water by-product of the condensation reaction by co-distilling water and monoterpene reaction solvent during the reaction. Water is produced as a by-product during a condensation reaction and, if allowed to build up in concentration, can slow the reaction down and limit the yield of condensation product. Refluxing the reaction solvent drives water out of the reaction mixture, which phase separates from the monoterpene reaction solvent to allow the monoterpene reaction solvent to recycle to the reaction mixture without the water by-product. This helps drive the reaction to higher yields.

Additionally, monoterpene reaction solvents can be largely removed (at least 97 weight-percent of the monoterpene reaction solvent can be removed) from the condensation reaction product under rather mild conditions of 105 degrees Celsius (° C.) under vacuum (pressure of one kilopascal or less; less than 10 millimeters mercury). This is desirable because high temperatures (greater than 200° C.) can cause degradation of the reaction product.

Even more surprisingly, the condensation reaction product produced in monoterpene reaction solvent when the monoterpene reaction solvent is used at a concentration of 50 wt % or more, preferably 60 wt % or more, or even 70 wt % or more of the weight of reactants and reaction solvent, is a clear (>70% transmittance) solution, and is stable to phase separation. This is in contrast to condensation reaction product run in aromatic solvents or in other non-aromatic solvents, which both produce hazy dispersions that settle over time even when prepared at concentrations of 79 wt % or more reaction solvent. Hence, the condensation reaction product produced by the method of the present invention can be stored or shipped as a concentrate prior to removing solvent without suffering from phase separation.

The present invention can further be free of tin compounds. The polyoxyalkylene functionalized MQ resin emulsifier is made by a condensation reaction. Tin catalysts are common in condensation reactions, but are undesirable in final coatings. The condensation reaction of the present invention that is used to prepare the polyoxyalkylene functionalized MQ resin emulsifier system can be run in an absence of tin catalysts to produce a slip additive that is free of tin catalysts.

A fingerprint of the condensation reaction that carries through to the final slip additive composition is the presence of monoterpene. The monoterpene used in the reaction solvent for the condensation reaction are difficult to fully remove from the reaction product, particularly under mild conditions desirable to maintain integrity of the reaction product. Hence, monoterpenes are present in the method and composition of the present invention.

In a first aspect, the present invention is a composition comprising a dispersion comprising: (a) a polyorganosiloxane comprising at least 90 mole-percent dimethyl D units and having a viscosity of one kilopascal*second or more at 25 degrees Celsius, the polyorganosiloxane being in the form of particles having an average size of 0.5 to 20 micrometers; (b) a condensation product of: (i) a polysiloxane resin having a weight-average molecular weight of 4,000-50,000 and having the following composition: $(R_3SiO_{1/2})_a(SiO_{4/2})_b(ZO_{1/2})_c$ where subscripts a, b and c are molar equivalents of the associated molecular unit, a is 0.30-0.60, subscript b is 0.40-0.70, subscript c is 0.05-0.20, the sum of subscripts a and b is one, R is independently in each occurrence selected from a group consisting of hydrogen, $C_{1-30}$ alkyl groups and aryl groups, and Z is independently in each occurrence selected from a group consisting of H, and $C_1$-$C_8$ alkyls; and (ii) a polyoxyalkylene polymer having a number average molecular weight of 4,500 Daltons or more and at the same time 50,000 Daltons or less and having the following composition: A—O—$(C_2H_4O)_e$$(C_3H_6O)_p$—A' where the ratio e/p is greater than one and less than 9, A and A' are independently selected from a group consisting of hydrogen, alkyl, substituted alkyl, aryl, and substituted aryl groups provided that at least one of A and A' is H; (c) a non-aqueous fluid carrier that is miscible with the polyoxyalkylene polymer; and (d) a monoterpene; wherein the weight-ratio of non-aqueous fluid carrier (c) to condensation product (b) is 0.5 or more and 10 or less; the weight-ratio of the combination of condensation product (b) and non-aqueous fluid carrier (c) to polyorganosiloxane (a) is 0.01 or more and 0.50 or less; and the composition contains less than one weight-part aromatic solvent per million weight parts composition.

In a second aspect, the present invention is a method for preparing the composition of the first aspect, the method comprising the steps of: (a) preparing a condensation product by conducting a condensation reaction in monoterpene reaction solvent, where the condensation reaction is run in the presence of less than one weight-percent aromatic solvent, where the condensation reaction is between: (i) a polysiloxane resin having a weight-average molecular weight of 4,000-50,000 and having the following composition: $(R_3SiO_{1/2})_a(SiO_{4/2})_b(ZO_{1/2})_c$ where subscripts a, b and c are molar equivalents of the associated molecular units, a is 0.30-0.60, subscript b is 0.40-0.70, subscript c is 0.05-0.20, the sum of subscripts a and b is one, R in each occurrence is selected from a group consisting of hydrogen, $C_{1-30}$ alkyl groups and aryl groups, and Z is in each occurrence selected from a group consisting of H, and $C_1$-$C_8$ alkyls; and (ii) a polyoxyalkylene polymer having a number average molecular weight of 4,500 Daltons or more and at the same time 50,000 Daltons or less and having the following composition: A—O—$(C_2H_4O)_e(C_3H_6O)_p$—A' where the value of e/p is greater than one and less than 9, A and A' are independently selected from a group consisting of hydrogen, alkyl, substituted alkyl, aryl, and substituted aryl groups provided that at least one of A and A' is H; (b) adding to the condensation product a non-aqueous fluid carrier that is miscible with the polyoxyalkylene polymer to form a mixture; (c) after step (a) and before step (d), removing monoterpene reaction solvent to a concentration of less than 10 weight-percent relative to condensation reaction product weight; and (d) dispersing into the mixture of step (c) a polyorganosiloxane comprising at least 90 mole-percent dimethyl D units and having a viscosity of one kiloPascal*second or more at 25 degrees Celsius under shear to produce a dispersion of polyorganosiloxane particles having an average size of 0.5 to 20 micrometers dispersed in the mixture of step (c) to form a composition; wherein: the weight-ratio of non-aqueous fluid carrier added in step (b) to condensation product prepared in step (a) is 0.5 or more and 10 or less; the weight-ratio of the combination of condensation product prepared in step (a) and non-aqueous fluid carrier added in step (b) to polyorganosiloxane dispersed in step (d) is 0.01 or more and 0.5 or less; composition contains less than one weight-part aromatic solvent per million weight parts composition; and the composition comprises monoterpene.

The composition of the present invention is useful as a slip additive in coating formulations. The process of the present invention is useful for preparing the composition of the present invention.

BRIEF DESCRIPTION OF DRAWINGS

FIG. 1(a) uses D-limonene as the reaction solvent. FIG. 1(b) uses xylene as the reaction solvent. FIG. 1(c) uses a 5:1 blend of n-butyl acetate and heptane (such as used in U.S. provisional patent application 62/838354) as the reaction solvent. The more heavily patterned area shows where the components form a single phase (that is, are soluble in one another) while the less patterned area is where the components form multiple phases (that is, they are not soluble in one another).

FIG. 2(a) uses D-limonene as the reaction solvent. FIG. 2(b) uses xylene as the reaction solvent. FIG. 2(c) uses a 5:1 blend of (by mass) n-butyl acetate and heptane as the reaction solvent. The more heavily patterned area shows where the components form a single phase (that is, are soluble in one another) while the less patterned area is where the components form multiple phases (that is, they are not soluble in one another).

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International; EN refers to European Norm; DIN refers to Deutsches Institut fur Normung; ISO refers to International Organization for Standards; and VDA refers to Verband der Automobilindustrie.

"Multiple" means two or more. "And/or" means "and, or as an alternative". All ranges include endpoints unless otherwise indicated. Products identified by their tradename refer to the compositions available from the suppliers under those tradenames at the priority date of this document unless otherwise stated herein.

"Alkyl" is a hydrocarbon radical derived from an alkane by removal of a hydrogen atom. "Substituted alkyl" is an alkyl that has an atom other than carbon and hydrogen in place of at least one carbon or hydrogen. Examples of substituted alkyls include alkyl amines and alkyl thiols.

"Aryl" is a radical derived from an aromatic hydrocarbon by removal of a hydrogen atom. "Substituted aryl" is an aryl that has an atom other than carbon and hydrogen in place of at least one carbon or hydrogen.

Designations of the type: "$C_{x-y}$" refer to having x or more and, at the same time, y or fewer carbon atoms.

"Miscible" components herein form a mixture that is transparent when viewed with the unaided eye.

"Boiling point" refers to boiling point at 101 kiloPascals pressure unless otherwise stated.

Siloxane units are characterized by the designation M, D, T and Q. M refers to a siloxane unit having the formula "$(CH_3)_3SiO_{1/2}$", or "trimethyl M unit". D refers to a siloxane unit having the formula "$(CH_3)_2SiO_{2/2}$", or a "dimethyl D unit". T refers to a siloxane unit having the formula "$(CH_3)SiO_{3/2}$". Q refers to a siloxane unit having the formula "$SiO_{4/2}$". Non-oxygen groups bound to the silicon atom in M, D and T units are methyl groups unless otherwise stated or indicated. Reference to a siloxane unit designation with the suffix "-type" refers to the siloxane unit where any one or more than one methyl group can actually be hydrogen or any carbon-bound substituent, including methyl. A "carbon-bound substituent" is a group that is bound to the silicon atom through a carbon atom. For instance, "D-type" siloxane units can have for example hydrogen, methyl, ethyl, propyl, butyl, phenyl, or any other carbon-bound substituent in any combination bound to the silicon atom at a non-oxygen location. Notably, an oxygen atom having a multiple of "1/2" subscript indicates that the oxygen bridges the specified atom to a second atom where the second atom is also specified with an oxygen having a multiple of "1/2" subscript. For example, "$(SiO_{4/2})(ZO_{1/2})$" refers to a Q-type group with a silicon atom bound through a single oxygen to a "Z" group.

"Aromatic solvent" refers to an aromatic material that is liquid at 23° C. at 101 kilopascals pressure, has a boiling point below 150° C., and that is miscible with one or more than one component of the presently claimed composition. Examples of aromatic solvents include benzene, toluene, ethyl benzene, and the isomers of xylene.

Composition of the Present Invention

The present invention includes a composition comprising a dispersion comprising a polyorganosiloxane, a condensation product of a polysiloxane resin and polyoxyalkylene polymer, a non-aqueous fluid that is miscible with the polyoxyalkylene polymer, and monoterpene. The dispersion comprises particles of the polyorganosiloxane polymer dispersed in a continuous phase that contains the condensation product and non-aqueous fluid carrier. The dispersion further comprises monoterpene that can be in the dispersed polyorganosiloxane polymer, the continuous phase, or both the dispersed polyorganosiloxane polymer and continuous phase.

The composition contains less than one weight-part aromatic solvent per million weight parts composition. Determine the amount of aromatic solvent in a system such as the present composition by gas chromatography with flame ionization detection (GC-FID). Dilute analyte (for example, MQ resin) 1:10 (w/w) in n-heptane by shaking until dispersed along with octane as an internal standard. Analyze the solution using GC-FID under the following conditions: apply a one-microliter injection of analyte solution at the inlet, maintained at a temperature of 280 degrees Celsius (° C.) at a 50:1 split with a helium carrier gas flowing at 2.0 milliliters per minute. Separation occurs in a DB-1 30 meter by 0.25 millimeter by 1.0 micrometer film column under a temperature gradient ranging from 30° C. to 300° C. at a rate of 15° C. per minute. Interpret data from the flame-ionization detector. Quantify aromatic content relative to the octane internal standard.

Polyorganosiloxane

The polyorganosiloxane of the present invention desirably has a viscosity of one kiloPascal*seconds (kPa*s) or more, 5 kPa*s or more, 10 kPa*s or more, 15 kPa*s or more, 20 kPa*s or more, 25 kPa*s or more, 30 kPa*s or more, 40 kPa*s or more, 50 kPa*s or more, 75 kPa*s or more, and even 100 kPa*s. Determine viscosities herein at 25 degrees Celsius (° C.) in a shear rate range from 0.0001 to 0.01 s$^{-1}$ using either a TA Instruments Discovery Hybrid Rheometer (DHR) or an Anton Paar Modular compact Rheometer (MCR) equipped with a 25 millimeter diameter cone and plate geometry. Viscosity values are steady shear viscosities. Preferably, the polyorganosiloxane is a "gum", which means it has a William's plasticity number of 30 or higher, preferably 50 or higher, as determined by ASTM method 926. The polyorganosiloxane comprises at least 90 mole-percent D units.

Generally, the polyorganosiloxane of the present invention desirably has the following average chemical structure:

where:

$R^1$ is independently in each occurrence selected from a group of alkyl, aryl, substituted alkyl and substituted aryl groups; where $R^1$ has one carbon or more and at the same time 30 carbons or fewer, preferably six carbons or fewer. $R^1$ can be methyl in each occurrence.

$R^2$ is independently in each occurrence selected from a group consisting of hydrogen, hydroxyl, alkyl, aryl, substituted alkyl and substituted aryl groups; where $R^2$ has 30 carbons or fewer, preferably six carbons or fewer. Examples of suitable $R^2$ groups include $C_{2-30}$ alkyls (such as ethyl, propyl, n-butyl and t-butyl), fluorinated $C_{2-30}$ alkyls, cyclohexyl, $C_{2-4}$ alkyl thiols, $C_{2-4}$ primary alkyl amines, —$C_nH_{2n}NR'C_mH_{2m}NR'_2$ where R' is either H or —$C_mH_{2m}CH(OH)CH_2OH$ and m and n are independently selected from integers in a range of 2 to 4, —$C_nH_{2n}OCH_2CH(OH)CH_2N(CH_2CH(OH)CH_3)_2$ where n is an integer selected from a range of 2 to 4, —$C_nH_{2n}OCH_2CHOCH_2$ where n is an integer selected from a range of 2 to 4, —$C_nH_{2n}C(O)OH$ where n is an integer selected from a range of 2 to 4, and —$SCH_2C(O)OH$.

$R^3$ is independently in each occurrence selected from the options for $R^1$ and $R^2$.

Subscripts x, y, z, u and v indicate the average number of the specific molecular unit associated with the subscript in the molecule; x is an integer selected from a range of 2-50; y is an integer selected from a range of 1-10,000; z is an integer selected from a range of 0-200; u is an integer selected from a range of 1-50; and v is an integer selected from a range of 1-50 provided that ($x+y+z+u+v$) is 2,000 or higher; ($u+v$)/($x+y+z+u+v$) is 0.4 or less; $z/y$ is 0.05 or less and $x/(x+y+z+u+v)$ is 0.6 or less; and provided the polyorganosiloxane has at least 90 mole-percent dimethyl D units.

The polyorganosiloxane can be linear or "substantially linear". Linear polyorganosiloxanes are characterized by the fact that the only siloxane units they contain are M-type and D-type siloxane units. "Substantially linear" polyorganosiloxanes are characterized by the fact that the only siloxane units they contain are M-type and D-type siloxane units and up to 5 moles of the sum of T-type and Q-type siloxane units per 100 moles of total siloxane units, and no two T or Q units are adjacent to one another in the molecule.

The polyorganosiloxane can advantageously have one or more than one terminal amine functionality. Terminal amine functionalities are desirable because they can react with other functionalities, such as acrylate and isocyanate functionalities, that are often present in binders. So, when compositions of the present invention comprise or are combined with acrylate functionalized binders in coating formulations, the terminal amines of the polyorganosiloxane can react and tie into the binder of the coating, which results in a coating with greater wear resistance and soil resistance.

Examples of suitable polyorganosiloxane include those in Table 1. XIAMETER™ and SILASTIC™ are trademarks of Dow Corning Corporation.

the volume-weighted median value of particle diameter distribution (Dv50) of the polyorganosiloxane using a Mastersizer™ 3000 laser diffraction particle size analyzer from Malvern Instruments.

Condensation Product

The composition of the present invention comprises a condensation product of: (i) a polysiloxane resin; and (ii) a polyoxyalkylene polymer. The condensation product of the polysiloxane resin and polyoxyalkylene polymer is a combination of multiple components including unreacted starting materials and materials that are produced during the condensation reaction. Isolating and identifying each component would be a difficult task. Moreover, removing any one of the reaction products may affect the function of the condensation product as an emulsifier for stabilizing the polyorganosiloxane particles in the non-aqueous fluid. The products of the condensation reaction are used in the composition of the present reaction without isolating reaction products from one another. Therefore, this component is described as the "condensation product" of these the two reactants in order to make clear that multiple products resulting from the reaction are present.

As described herein below, the condensation reaction is run in a monoterpene reaction solvent. Most of the monoterpene reaction solvent can be removed after the condensation reaction is complete. However, not all of the monoterpene

TABLE 1

| Component | Description |
|---|---|
| A1 | Hydroxyl terminated polydimethylsiloxane HO—(Si(CH$_3$)$_2$O)$_n$—Si(CH$_3$)$_2$—OH that has a number-averaged molecular weight of approximately 365,000 and a weight-averaged molecular weight of approximately 530,000 as measured by GPC, and a plasticity value within the limit 55-65 according to the method described above. (Commercially available from The Dow Chemical Company under the tradename XIAMETER ™ RBG-0910 Gum.) |
| A2 | CH$_3$NHCH$_2$CH(CH$_3$)—CH$_2$—(Si(CH$_3$)$_2$O)$_n$—Si(CH$_3$)$_2$—CH$_2$CH(CH$_3$)CH$_2$NHCH$_3$. Prepare in the following manner: In a DAC 500 FVZ SpeedMixer™ cup, 401.44 grams of A1 (XIAMETER™ 0910 Gum) and 0.48 grams of 1,2,2,4-tetramethyl-1-aza-2-silacyclopentane were added and mixed 5 times for 30 seconds each time at 2350 RPM. The content was let cool for 15 minutes between mixes. After the mixing, the content was placed in a 70° C. oven for 12 hours. A2 has a plasticity value similar to A1. |
| A3 | Vinyl terminated polydimethylsiloxane CH$_2$=CH—(Si(CH$_3$)$_2$O)$_n$—Si(CH$_3$)$_2$—CH=CH$_2$ having a number-averaged molecular weight of approximately 360,000 and a weight-average molecular weight of 660,000 as measured by GPC, and a plasticity value within the limit 55-65 according to the method described above.(commercially available from The Dow Chemical Company under the tradename SILASTIC ™ 4-7033 Gum |

Determine weight-average molecular weight (Mw) and number-average molecular weight (Mn) values for the polyorganosiloxane by triple-detector (light-scattering, refractive index and viscosity detectors) gel permeation chromatography (GPC) and a single polystyrene standard.

Determine plasticity for the polyorganosiloxane according to ASTM method 926.

In the method of the present invention the polyorganosiloxane is dispersed into the condensation product and non-aqueous carrier to form a dispersion of polyorganosiloxane particles. In the composition of the present invention, the polyorganosiloxane is present as dispersed particles having an average particle size of 0.5 micrometers (μm) or more and can be 1.0 μm or more, 2.0 μm or more, 3.0 μm or more, 4.0 μm or more, 5.0 μm or more and even 10 μm or more while at the same time is desirably 20 μm or less, preferably 15 μm or less, 12 μm or less, 10 μm or less, 8 μm or less, 6 μm or less, even 5 μm or less. Determine average particle size as reaction solvent can be removed from the condensation reaction product, while maintaining temperatures below 200° C. and removal times that are commercially feasible (for instance, 10 hours or less, preferably 6 hours or less, more preferably 3 hours or less and most preferably 2 hours or less) and so some monoterpene reaction solvent is carried through into the composition of the present invention as a fingerprint of the condensation reaction.

The condensation product, along with the carrier fluid described below, serves as an emulsifier that enables dispersing and stabilizing the polyorganosiloxane into particles in the claimed particle size range. The presence of monoterpene is a fingerprint of the condensation reaction having been conducted in a monoterpene reaction solvent.

Polysiloxane Resin. The polysiloxane resin desirably has a weight-average molecular weight of 4,000 or more, 6,000 or more, 8,000 or more, 10,000 or more, 12,000 or more, 14,000 or more, 16,000 or more, 18,000 or more, 20,000 or more and at the same time desirably has a weight-average molecular weight of 50,000 or less, 48,000 or less, 46,000 or less, 44,000 or less, 42,000 or less, 40,000 or less, 38,000 or less, 36,000 or less, 34,000 or less, 32,000 or less 30,000 or less, 28,000 or less, 26,000 or less, 25,000 or less, or even 24,000 or less. Determine weight-average molecular weight in Daltons using triple-detector gel permeation chromatography (light-scattering, refractive index and viscosity detectors) and a single polystyrene standard.

(a=0.43, b=0.57, c=0.11, R=methyl; Z=3 H; from Momentive), and BELSIL™ TMS 803 (a=0.41, b=0.59, c=0.08, R=methyl; Z=3:5 molar ratio of H:ethyl; BELSIL is a trademark of Wacker Chemie AG).

Specific examples of suitable polysiloxane resin include those in Table 2. The structure of the polysiloxane resin is provided in terms of the following structure, as described above:

$$(R_3SiO_{1/2})_a(SiO_{4/2})_b(ZO_{1/2})_c$$

TABLE 2

| Component | Description |
|---|---|
| R1 | Trimethylsiloxysilicate resin having a weight-averaged molecular weight of approximately 27,500 as measured by GPC and where R is methyl, Z is a >90:10 mole ratio of hydrogen and isopropyl, a is approximately 0.43, b is approximately 0.57, c is approximately 0.13. (Commercially available from The Dow Chemical Company under the tradename DOWSIL ™ MQ-1600 Solid Resin.) |
| R2 | Trimethylsiloxysilicate resin prepared by a silicate-based method of the type listed above having a weight-averaged molecular weight of approximately 8,700 as measured by GPC and where R is methyl, Z is a >90:10 mole ratio of hydrogen and isopropyl, a is approximately 0.48, b is approximately 0.56, c is approximately 0.15. |
| R3 | Trimethylsiloxysilicate resin prepared by a silicate-based method of the type listed above having a weight-averaged molecular weight of approximately 29,500 as measured by GPC and where R is methyl, Z is a >90:10 mole ratio of hydrogen and isopropyl, a is approximately 0.43, b is approximately 0.57, c is approximately 0.13. |

The polysiloxane resin is an MQ resin having the following general composition:

$$(R_3SiO_{1/2})_a(SiO_{4/2})_b(ZO_{1/2})_c$$

where:

Subscripts a, b and c refer to the average molar ratio of the group associate with the subscript relative to total moles of silicon atoms in the molecule. Subscript a is a value in a range of 0.30-0.60, subscript b is a value selected from a range of 0.40-0.70, subscript c is a value selected from a range of 0.05-0.20. Necessarily, the sum of the values of subscripts a and b is one. For clarity, $ZO_{1/2}$ units are necessarily attached to Q units of the polysiloxane resin molecule. Desirably, the ratio of subscript a to subscript b is a value selected from a range of 0.4 to 1.5. Determine the values for subscripts a, b and c using $^{29}Si$, $^{13}C$, and $^1H$ nuclear magnetic resonance spectroscopy (see, e.g., The Analytical Chemistry of Silicones, Smith, A. Lee, ed., John Wiley & Sons: New York, 1991, p. 347ff.).

R is independently in each occurrence selected from a group consisting of hydrogen, $C_{1-30}$ alkyl groups, $C_{1-30}$ substituted alkyl, aryl and substituted aryl groups cont. Typically, R is independently in each occurrence selected from a group consisting of $C_{1-30}$ alkyl groups and aryl groups, more typically $C_{1-6}$ alkyl an phenyl groups. Most typically, R is independently in each occurrence selected from methyl, ethyl, propyl and butyl groups.

Z is independently in each occurrence selected from a group consisting of H and $C_{1-8}$ alkyls. Typically, Z is independently in each occurrence selected from a group consisting of H, methyl, ethyl, propyl and butyl. Preferably, Z is hydrogen.

Suitable polysiloxane resins are obtainable by synthetic methods taught in US2676182, US3627851, US3772247, US8017712 and US5548053. Suitable commercially available polysiloxane resins include those commercially available as DOWSIL™ MQ-1600 Resin (DOWSIL is a trademark of The Dow Chemical Company), SR-1000 MQ Resin Polyoxyalkylene Polymer. The polyoxyalkylene polymer has the following composition:

$$A\text{—}O\text{—}(C_2H_4O)_e(C_3H_6O)_p\text{—}A'$$

where:

The subscripts e and p correspond the average number of ethylene oxide and propylene oxide units in the molecule respectively. The ratio e/p is desirably one or more and can be 2 or more, 3 or more, 4 or more, 5 or more, 6 or more and at the same time is typically 9 or less, and can be 8 or less, 7 or less, 6 or less, even 5 or less. Desirably, the sum of e and p is 100 or higher, preferably 110 or higher, 120 or higher, 130 or higher, 140 or higher and at the same time is typically 1000 or lower, 750 or lower or even 500 or lower.

Determine the e/p mole ratio (X) from ratios of peak integrations in $^{13}C$— or $^1H$-nuclear magnetic resonance spectroscopy. Calculate a modified molecular weight value (Y) that excludes the weight of the polymer endgroups from the number average molecular weight value as Mn—($M^A$+$M^{A'}$+16.00), where Mn is the number average molecular weight, $M^A$ is the molar mass of the A end group, $M^{A'}$ is the molar mass of the A' end group. The value of "p" is Y/(44.05*X+58.08). The value of "e" is the value of "p" multiplied by the e/p mole ratio (X). Determine $M^A$ and $M^{A'}$ by first identifying the composition of A and A' using $^{13}C$— or $^1H$— nuclear magnetic resonance spectroscopy. If the signal for A and A' is too low to determine structure by $^{13}C$— or $^1H$—nuclear magnetic resonance spectroscopy under conditions sufficient to determine the e/p ratio, then the molecular weight of A and A' can be considered negligible and use zero for the value of $M^A$ and $M^{A'}$.

The propylene oxide component is valuable in the polyoxyalkylene polymer in order to increase flexibility of the resulting condensation product. The polyoxyalkylene polymer is linked to the polysiloxane resin molecules. The propylene oxide component is required to ensure fluidity in the polyoxyalkylene so the latter is a liquid for easy handing and mixing. The ethylene oxide and propylene oxide units can be in a block configuration, randomly distributed or partially in block configuration and partially random within the polyoxyalkylene polymer.

A and A' are independently in each occurrence selected from a group consisting of hydrogen, alkyl, substituted alkyl, aryl, and substituted aryl groups provided at least one of A and A' is hydrogen. Examples of suitable alkyl groups include methyl, ethyl, propyl, and butyl. Desirably, both A and A' are hydrogen.

The polyoxyalkylene polymer has a number-average molecular weight of 4,500 Daltons (Da) or more, typically 5,000 Da or more, preferably 10,000 Da or more, more preferably 12,500 Da or more while at the same time is typically 50,000 Da or less, preferably 30,000 Da or less, even more preferably 20,000 Da or less. Determine number-average molecular weight by gel permeation chromatography using 100 microliter injection of a 15 milligram per milliliter concentration of sample onto a Polymer Labs PLgel 5 micrometer guard column (50 millimeters by 7.5 millimeters) followed by two Polymer Labs PLgel 5 micrometer Mixed-C columns (300 millimeters by 7.5 millimeters) using tetrahydrofuran eluent at one milliliter per minute flow rate, a differential refractive index detector at 35° C. and 16 narrow polystyrene standards spanning a molecular weight range of 580 Da through 2,300,000 Da.

Specific examples of suitable polyoxyalkylene polymers include those in Table 3.

TABLE 3

| Component | Description |
|---|---|
| P1 | $HO(EO)_{310}(PO)_{63}OH$ random copolymer having a number average molecular weight of approximately 17,000 Daltons commercially available from the Dow Chemical Company under the trade name UCON ™ Lubricant 75-H-90,000 |
| P2 | $CH_3CH_2CH_2CH_2(EO)_{146}(PO)_{21}OH$ predominately random copolymer having a number average molecular weight of approximately 8,000 Daltons prepared as "P2" described in the Examples, below. |

Non-Aqueous Fluid Carrier (Carrier Fluid)

The composition of the present invention comprises a non-aqueous fluid that serves as a carrier fluid for the condensation product and serves as a continuous phase into which the polyorganosiloxane is dispersed. The non-aqueous fluid carrier is miscible with the polyoxyalkylene polymer. The non-aqueous fluid carrier is also called the non-aqueous polar fluid.

The weight ratio of the non-aqueous fluid carrier to condensation product is 0.5 or more, and can be one or more, 2 or more, 3 or more, 4 or more, 5 or more, 6 or more, 7 or more, even 8 or more while at the same time is generally 10 or less and can be 9 or less, 8 or less, 7 or less, 6 or less, even 5 or less.

The ratio of the combined weight of the condensation product and the non-aqueous fluid carrier to the weight of polyorganosiloxane is typically 0.01 or more, 0.05 or more, 0.15 or more, 0.20 or more, 0.25 or more, 0.30 or more, 0.35 or more, 0.40 or more, even 0.45 or more, while at the same time is generally 0.50 or less and can be 0.45 or less, 0.40 or less, 0.35 or less, 0.30 or less, 0.25 or less, 0.20 or less, 0.15 or less, 0.10 or less, and even 0.05 or less.

Examples of materials that are suitable as a non-aqueous fluid carrier (or "carrier fluid") for the present invention include alcohol ethoxylates, silicone polyethers, and polyglycols (including diglycols and/or polymers of three or more glycols). Specific examples of suitable non-aqueous carrier fluids include those in Table 4.

TABLE 4

| Component | Description |
|---|---|
| C1 | A secondary alcohol ethoxylate of the formula $C_nH_{2n+1}(OCH_2CH_2)_9OH$ with n = 11-15 (for example, "TERGITOL ™ 15-S-9 Surfactant available from The Dow Chemical Company) |
| C2 | Butanol initiated EO/PO random copolymer having the following general chemical structure: $CH_3CH_2CH_2CH_2(OCH_2CH_2)_{15}(OCH_2CH(CH_3))_9OH$ (UCON ™ Lubricant 50-HB-400 from The Dow Chemical Company) |
| C3 | $CH_3(OCH_2CH_2)_{11}OCH_3$ (Polyethylene glycol dimethyl ether 500 from Sigma Aldrich) |
| C4 | $(Me_2SiO_{1/2})(Me_2SiO_{2/2})_{60}(Me(CH_2CH_2(OCH_2CH_2)_{18}(OCH_2CH(CH_3))_{18}OAc)_8(Me_3SiO_{1/2})$ (available as XIAMETER ™ OFX-5330 Fluid from The Dow Chemical Company). |
| C5 | $CH_3CH(OH)CH_2OCH_2CH(OH)CH_3$ (Dipropylene glycol LO+ from The Dow Chemical Company) |

Monoterpene

Monoterpenes are a class of terpenes that consist of two isoprene units and have the molecular formula $C_{10}H_{16}$. Monoterpenes may be linear (acyclic) or contain rings (monocyclic and bicyclic). Examples of monoterpenes include limonene (D-limonene and/or L-limonene), 3-carene, camphene, γ-terpinene, and α-pinene. The composition of the present invention can comprise any one or any combination of more than one monoterpene. By definition, monoterpenes are free of aromaticity (that is, the monoterpenes are non-aromatic). Desirably, the monoterpene present in the composition has a boiling point of 190° C. or lower.

The monoterpenes have at least one Hansen solubility parameter outside the ranges of 15.0-22.6 $(MPa)^{1/2}$ for $\delta_d$, 2.8-7.0 $(MPa)^{1/2}$ for $\delta_p$ and 4.0-7.5 $(MPa)^{1/2}$ for $\delta_h$. In particular, the $\delta_p$ parameter for monoterpenes is nearly always lower than 2.8 $(MPa)^{1/2}$ and many have a $\delta_h$ value below 4.0. For example, consider the Hansen solubility parameters in Table 5 for monoterpenes (values obtain from A. Filly et al, C. R. Chimie 17 (2014) 1268-1275):

TABLE 5

| Monoterpene | $\delta_d$ $(MPa)^{1/2}$ | $\delta_p$ $(MPa)^{1/2}$ | $\delta_h$ $(MPa)^{1/2}$ |
|---|---|---|---|
| α-pinene | 16.4 | 1.3 | 2.0 |
| 3-carene | 17 | 1.3 | 2.0 |
| α-terpinene | 16.4 | 0.7 | 2.7 |
| δ-terpinene | 16.6 | 2.9 | 2.9 |
| limonene | 16.7 | 2.2 | 4.9 |

Monoterpene enters the composition with the condensation product. As described further below, one of the surprising features of the present invention is that the condensation reaction used to make the condensation product can be run in a monoterpene reaction solvent. After the condensation reaction is complete, the majority of the monoterpene can be removed under mild conditions of 105 degrees Celsius (° C.) under vacuum (one kilopascal or less; less than 10 millimeters mercury), which is desirable to preserve the integrity of the reaction product. However, removal of all the monoterpene of the monoterpene reaction solvent from the condensation reaction product is not feasible so some remains and is carried with the condensation product into the composition of the present invention.

Typically, the concentration of monoterpene in the composition of the present invention is 10 weight-percent (wt %) or less, 5 wt % or less, 3 wt % or less, and can be 2 wt % or less, one wt % or less, 0.9 wt % or less, 0.8 wt % or less, 0.7 wt % or less, 0.6 wt % or less, 0.5 wt % or less, 0.4 wt % or less, 0.3 wt % or less, 0.2 wt % or less, 0.1 wt % or less, 0.05 wt % or less, 0.01 wt % or less, even 0.005 wt % or less while at the same time is typically 0.0001 wt % or more, 0.001 wt % or more and can be 0.005 wt % or more, 0.01 wt % or more, 0.05 wt % or more, even 0.1 wt % or more based on composition weight.

Aqueous Liquid

The composition of the present invention can further include an aqueous liquid mixed with the other components. Aqueous liquid, preferably water, is optionally included primarily as a dilution liquid and is desirable when the composition is part of a water-based coating formulation. The concentration of aqueous liquid can be up to 500 weight-parts per 100 weight-parts of the polyorganosiloxane.

Binders

The composition of the present invention can further comprise one or more than one binder. The dispersion of the composition of the present invention is useful as a slip aid in compositions such as coating compositions. Coatings compositions contain binders that form a film over a substrate. Examples of binders that can be present in the composition of the present invention include acrylic and/or polyurethanes binders. Acrylic binders include solvent based acrylic, acrylic emulsions, water-based anionic emulsions of pure acrylic copolymer, water-based anionic self-crosslinking styrene-acrylic copolymer emulsions, water-based anionic, styrene-acrylic emulsion containing free hydroxyl groups and water-based anionic self-crosslinking copolymer emulsions. Polyurethane binders include water-based anionic dispersions of aliphatic polycarbonate urethane, water-based solvent free anionic dispersions of aliphatic polyether urethane, aqueous non-ionic dispersions of aliphatic polyester urethane and aqueous solvent-free anionic dispersions of an aliphatic polycarbonate-polyether urethane.

Low Levels of Aromatic Solvent

An exceptionally low concentration of aromatic solvent is a characteristic feature of the composition of the present invention along with the presence of monoterpene. The concentration of aromatic solvent is one weight part per million (ppm) or less, preferably 0.9 ppm or less, 0.8 ppm or less, 0.7 ppm or less, 0.6 ppm or less, 0.5 ppm or less, 0.4 ppm or less, 0.3 ppm or less, 0.2 ppm or less, 0.1 ppm or less, 0.09 ppm or less, 0.08 ppm or less, 0.07 ppm or less, 0.06 ppm or less, or even 0.05 ppm or less relative to the weight parts of the composition (that is, ppm is weigh part per million weight parts of composition). The concentration of aromatic solvent can be zero ppm. However, typically a small amount of aromatic solvent is present as a contaminant of one of the other components. Determine ppm aromatic solvent in the composition by the GC-FID method as described previously above for determining concentration of aromatic solvent.

Catalyst

Another advantage of the present invention is that it can be free of tin catalysts. Some condensation reactions require the use of tin catalysts, which, if used in preparing dispersions of polyorganosiloxanes, are carried through to the final composition. Tin catalysts are undesirable in some applications. The condensation reaction used to prepare the condensation product of the present invention can be run without tin catalyst thereby avoiding introduction of tin catalyst. As such, the condensation reaction product and final composition can be free of tin catalyst.

Method of the Present Invention

The present invention includes a method for preparing the composition of the present invention. The method comprises:

(a) preparing a condensation product by conducting a condensation reaction in monoterpene reaction solvent, where the condensation reaction is run in the presence of less than one weight-percent aromatic solvent, where the condensation reaction is between:

(i) a polysiloxane resin having a weight-average molecular weight of 4,000-50,000 and having the following composition:

$(R_3SiO_{1/2})_a(SiO_{4/2})_b(ZO_{1/2})_c$ where subscripts a, b and c are molar equivalents of the associated molecular units, a is 0.30-0.60, subscript b is 0.40-0.70, subscript c is 0.05-0.20, the sum of subscripts a and b is one, R in each occurrence is selected from a group consisting of hydrogen, $C_{1-30}$ alkyl groups and aryl groups, and Z is in each occurrence selected from a group consisting of H, and $C_1$—$C_8$ alkyls; and (ii) a polyoxyalkylene polymer having a number average molecular weight of 4,500 Daltons or more and at the same time 50,000 Daltons or less and having the following composition:

A—O—$(C_2H_4O)_e(C_3H_6O)_p$—A' where the value of e/p is greater than one and less than 9, A and A' are independently selected from a group consisting of hydrogen, alkyl, substituted alkyl, aryl, and substituted aryl groups provided that at least one of A and A' is H;

(b) adding to the condensation product a non-aqueous fluid carrier that is miscible with the polyoxyalkylene polymer to form a mixture;

(c) after step (a) and before step (d), removing monoterpene reaction solvent to a concentration of less than 10 weight-percent relative to condensation reaction product weight including removing any aromatic solvent to a concentration of less than 5 weight-parts per million weight parts of condensation product;

(d) dispersing into the mixture of step (c) a polyorganosiloxane comprising at least 90 mole-percent dimethyl D units and having a viscosity of one kilopascal*seconds or more at 25 degrees Celsius under shear to produce a dispersion of polyorganosiloxane particles having an average size of 0.5 to 20 micrometers dispersed in the mixture of step (c) to form a composition; wherein:

the weight-ratio of non-aqueous fluid carrier added in step (b) to condensation product prepared in step (a) is 0.5 or more, 1.0 or more, 1.5 or more, 2.0 or more, 3.0 or more, 4.0 or more, 5.0 or more, 6.0 or more, 7.0 or more, even 8.0 or more while at the same time is typically 10 or less, 9.0 or less, and can be 8.0 or less, 7.0 or less, 6.0 or less, 5.0 or less, 4.0 or less, 3.0 or less, 2.0 or less, even 1.0 or less;

the weight-ratio of the combination of condensation product prepared in step (a) and non-aqueous fluid carrier added in step (b) to polyorganosiloxane dispersed in step (d) is 0.01 or more, 0.05 or more, 0.1 or more, 0.2 or more, 0.3 or more, or even 0.4 or more, while at the same time is generally 0.5 or less, and can be 0.4 or less, 0.3 or less, 0.2 or less, even 0.1 or less;

the composition contains less than one weight-part aromatic solvent per million weight parts composition; and the composition comprises monoterpene.

The polysiloxane resin, polyoxyalkylene polymer, non-aqueous carrier fluid and polyorganosiloxane are as described herein above.

The monoterpene reaction solvent can be one or a combination of more than one monoterpene as described herein above. The monoterpene desirably has a boiling point of 190° C. or lower to facilitate removal of most of the monoterpene under mild conditions (105° C. under vacuum (pressure of one kilopascal or less). The monoterpene reaction solvent can alternatively contain up to 25 wt %, preferably up to 20 wt %, more preferably up to 15 wt % of a non-aromatic hydrocarbon other than monoterpene that is selected so as to provide a monoterpene reaction solvent that has a lower boiling point than the monoterpene component (s) alone. Wt % non-aromatic hydrocarbon is relative to monoterpene reaction solvent weight (sum of monoterpenes and any non-aromatic hydrocarbons). Such non-aromatic hydrocarbons typically have a boiling point of 150° C. or lower and at the same time 50° C. or higher, preferably 60° C. or higher, even 65° C. or higher. Examples of suitable non-aromatic hydrocarbons other than monoterpene include n-hexane (boiling point of 68.7° C.), n-heptane (boiling point of 98.4° C.), and n-octane (boiling point of 126° C.).

Prepare the condensation product by conducting a condensation reaction between the polysiloxane resin and the polyoxyalkylene polymer in the monoterpene reaction solvent. The polysiloxane resin, polyoxyalkylene polymer and monoterpene reaction solvent form a reaction mixture. The polysiloxane resin and polyoxyalkylene polymer (reactants) are desirably present at a concentration of 10 wt % or more of the reaction mixture. Desirably, the reaction mixture is 50 wt % or more, preferably 60 wt % or more, even more preferably 70 wt % or more and can be 80 wt % or more monoterpene reaction solvent based on reaction mixture weight because when the reaction is run with this level of monoterpene reaction solvent the reaction product tends to be clear (>70% transmittance as measure as described herein below).

The reaction is run the presence of less than one wt %, preferably 0.5 wt % or less, 0.25 wt % or less, 0.10 wt % or less, 0.09 wt % or less, 0.075 wt % or less, 0.01 wt % or less, 0.005 wt % or less, 0.001 wt % or less, 0.0005 wt % (5 ppm) or less, 0.0001 wt % (1 ppm) or less or even in an absence of aromatic solvent based on total weight of polysiloxane resin, polyoxyalkylene polymer and monoterpene reaction solvent. The condensation reaction can be run in the presence of a tin condensation catalyst or in an absence of a tin condensation catalyst.

In general, the condensation reaction can be conducted by first preparing a solution of polyorganosiloxane resin in a monoterpene reaction solvent. Add polyoxyalkylene polymer and, if desired, condensation catalyst to form a reaction mixture. Heat the reaction mixture to reflux, preferably using a Dean-Stark trap or other means for co-distilling and separating water from the reaction solvent while returning reaction solvent to the reaction mixture. Maintain a vigorous reflux to conduct the reaction. Typically, reflux is maintained for 20 hours or less and can be 10 hours or less, even 5 hours or less depending on reactants, catalyst and the extent of reaction desired. If desired, chemically neutralize and filter the reaction mixture after refluxing. If desired, filter the reaction mixture using a filter having a nominal pore size of 5.0 micrometers. After the condensation reaction is complete, most of the reaction solvent can be exchanged for a carrier fluid by adding the carrier fluid and removing reaction solvent by vacuum distillation. Specific examples of how to conduct a condensation reaction and exchange carrier fluid for reaction solvent are in the Examples section, below.

Figure 1A:
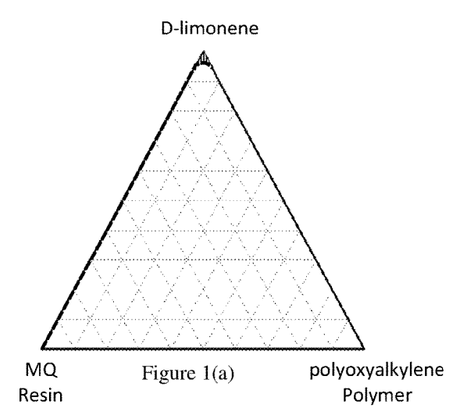
FIGS. 1(a)-1(c) illustrate a phase diagram for a mixture of polysiloxane resin (MQ resin), polyoxyalkylene polymer (POA) and a reaction solvent.
Figure 1B:
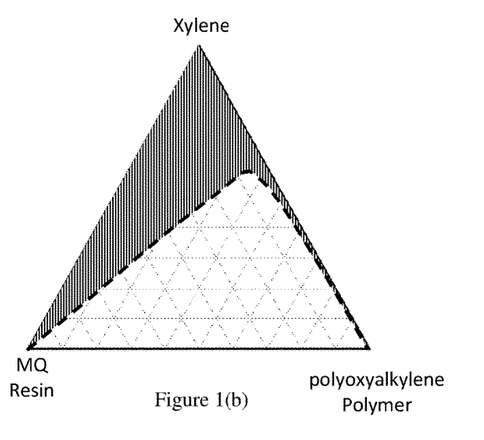
Figure 1C:
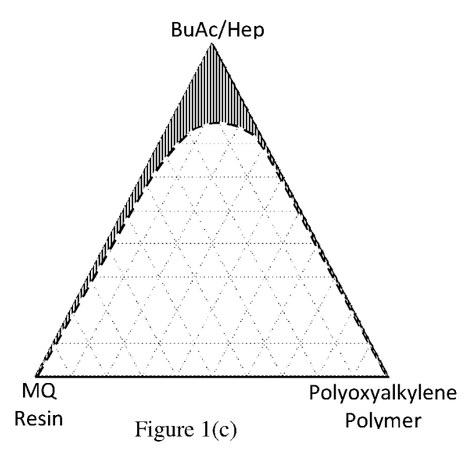

A surprising aspect of the present invention is that it can be run in a monoterpene reaction solvent. Unlike aromatic solvents and blends of solvents like n-butyl acetate and heptane, the reactants of the condensation have a particularly poor co-solubility in the monoterpene before the condensation reaction begins. See, for example, FIGS. 1(a0-1(c), which illustrate a phase diagram for a polysiloxane resin (DOWSIL™ MQ-1600 Solid Resin), a polyoxyalkylene polymer (UCON™ Lubricant 75-H-90,000) and a monoterpene solvent (D-limonene). FIG. 1(a) illustrate the diagram using D-limonene as the solvent. FIG. 1(b) illustrates the diagram with xylene as the solvent. FIG. 1(c) illustrates the diagram with a solvent that is a 5:1 (wt ratio) mixture of n-butyl acetate and heptane. The darkened region illustrates where the components are soluble in one another and form a clear solution. D-limonene appears to be a poor solvent for these components that are the reactants for a condensation reaction of the present invention. Nonetheless, as the examples below show, D-limonene is surprisingly a particularly good reaction solvent for the condensation reaction and, unlike the aromatic solvent and n-butyl acetate/heptane solvent, results in a clear reaction product.

Figure 2A:
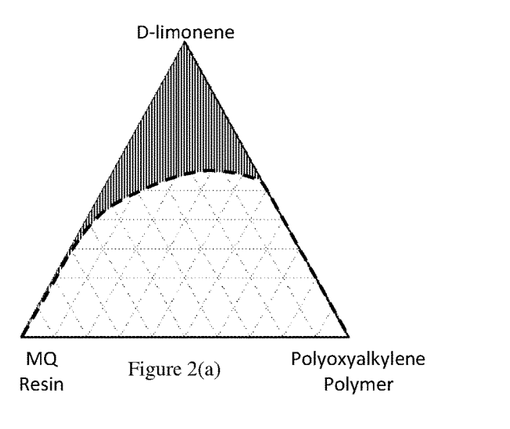
FIGS. 2(a)-2(c) illustrate a phase diagram for a mixture of polysiloxane resin (MQ resin), polyoxyalkylene polymer (POA) and a reaction solvent in the presence of condensation reaction product of the MQ resin and POA after running the reaction with similar initial concentrations of reactants and by refluxing for similar periods of time.
Figure 2B:
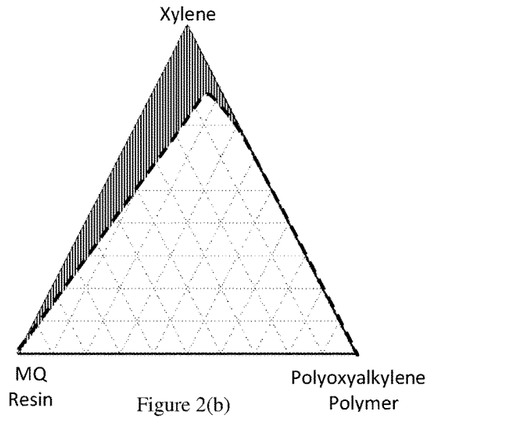
Figure 2C:
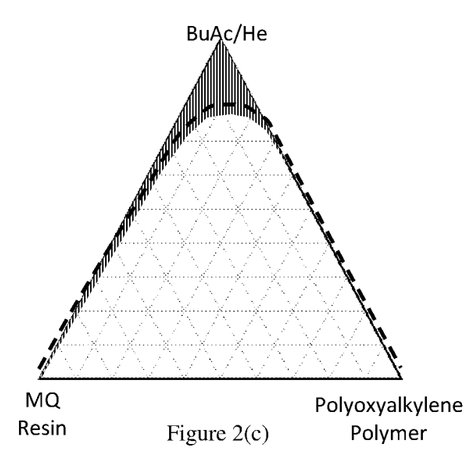

Perhaps part of the reason why the monoterpenes are a good condensation reaction solvent for the condensation reaction of the present invention is that as the condensation reaction progresses and condensation product forms, the co-solubility of the reactants actually increases dramatically in the monoterpene—to an unexpected and dramatically greater extent than in either the xylene or the n-butyl acetate/heptane mixture. FIGS. 2(a)-2(c) illustrate the same phase diagrams in the presence of condensation reaction product made from reactions mixtures that had the same initial reactant concentrations and were refluxed for similar periods of time. The darkened section is dramatically higher in FIG. 2(a) with the limonene solvent relative to either FIG. 1(a) (same diagram without condensation product present) or FIG. 2(b) (xylene solvent with reaction product) or FIG. 2(c) (n-butyl acetate/heptane solvent with condensation product). Without being bound by theory, this unique solubility behavior of the monoterpenes is expected to contribute to it being a particularly good condensation reaction solvent for the present invention, not to mention it is non-aromatic and can be mostly removed under mild conditions.

Upon completing the condensation reaction and obtaining a condensation product, and doing any desired catalyst neutralization and filtration, add to the condensation product a non-aqueous fluid carrier that is miscible with the polyoxyalkylene polymer to form a mixture. The non-aqueous fluid carrier is described above under the Composition of the Present Invention section. Add an amount of non-aqueous carrier so as to achieve a concentration as described for the composition of the present invention.

After the condensation reaction and prior to the dispersing step described below, remove monoterpene reaction solvent to achieve a concentration of monoterpene that is 10 wt % or less, preferably 8 wt % or less, 6 wt % or less, 4 wt % or less, 3 wt % or less, preferably 2 wt % or less and can be one wt % or less, 0.9 wt % or less, 0.8 wt % or less, 0.7 wt % or less, 0.6 wt % or less, 0.5 wt % or less, 0.4 wt % or less, 0.3 wt % or less, 0.2 wt % or less, 0.1 wt % or less, 0.05 wt % or less, 0.01 wt % or less, even 0.005 wt % or less while at the same time is typically 0.0001 wt % or more, 0.001 wt % or more and can be 0.005 wt % or more, 0.01 wt % or more, 0.05 wt % or more, even 0.1 wt % or more relative to condensation reaction product weight. At this point aromatic solvent is desirably at a concentration of 5 weight-parts per million or less based on condensation product weight.

Disperse into the mixture resulting from combining the non-aqueous fluid carrier with the condensation product, after removal of monoterpene reaction solvent, a polyorganosiloxane comprising at least 90 mole-percent dimethyl D units and having a viscosity of one kilopascal*second or more at 25 degrees Celsius under shear to produce a dispersion of polyorganosiloxane particles having an average size of 0.5 to 20 micrometers dispersed in the mixture to form a composition. The polyorganosiloxane is as described previously for the composition of the present invention.

The composition of the present invention is useful as, for example, a slip additive for coating applications. Coatings containing the composition can be useful as protective coatings for substrates, especially for protecting substrates from scuffing and marring. For example, the composition can be in a slip additive for coatings useful on rigid materials or flexible materials such as leather.

EXAMPLES

Table 6 identifies the components for use in the following samples. "Me" refers to a methyl group. DOWSIL™ is a trademark of The Dow Chemical Company. XIAMETER™ and SILASTIC™ is a trademark of Dow Corning Corporation. UCON™ and TERGITOL™ are trademarks of Union Carbide Corporation. TYZOR™ is a trademark of E.I. Du Pont De Nemours and Company. PERMUTEX™ is a trademark of Stahl International B.V. Company.

TABLE 6

| Material | Description | Source |
| --- | --- | --- |
| Polyorganosiloxanes | | |
| A1 | Hydroxyl terminated polydimethylsiloxane HO—(Si(CH$_3$)$_2$O)$_{3600}$—Si(CH$_3$)$_2$—OH that has a number-averaged molecular weight of approximately 365,000 and a weight-averaged molecular weight of approximately 530,000, and a plasticity of 55-65. | XIAMETER™ RBG-0910 Gum from The Dow Chemical Company "TDCC"). |
| A2 | CH$_3$NHCH$_2$CH(CH$_3$)—CH$_2$—(Si(CH$_2$)$_2$O)$_{3600}$—Si(CH$_3$)$_2$—CH$_2$CH(CH$_3$)CH$_2$NHCH$_3$ having a Mn of approximately 265,000 Daltons and Mw of approximately 530,000 Daltons and plasticity of 55 to 65. | Prepare as described below. |
| A3 | Vinyl terminated polydimethylsiloxane CH$_2$CH—(Si(CH$_3$)$_2$O)$_{5400}$—Si(CH3)$_2$—CH=CH$_2$ having a number-averaged molecular weight of approximately 360,000 and a weight-average molecular weight of 660,000, and a plasticity value of 55-65. | SILASTIC™ 4-7033 Gum from TDCC. |
| Polysiloxane Resins | | |
| R1 | (R$_3$SiO$_{1/2}$)$_{0.43}$(SiO$_{4/2}$)$_{0.57}$(ZO$_{1/2}$)$_{0.13}$ where R is methyl, Z is approximately 90:10 mole ratio of hydrogen and isopropyl, and having a Mw of approximately 27,500. | DOWSIL™ MQ-1600 Solid Resin from TDCC. |

TABLE 6-continued

| Material | Description | Source |
|---|---|---|
| R2 | $(R_3SiO_{1/2})_{0.48}(SiO_{4/2})_{0.56}(ZO_{1/2})_{0.15}$ where R is methyl, Z is approximately 90:10 mole ratio of hydrogen and isopropyl, and having a Mw of approximately 8,700. | Prepare as described in U.S. Pat. No. 2,676,182, U.S. Pat. No. 3,627,851, U.S. Pat. No. 3,772,247, U.S. Pat. No. 8,0177,12 and U.S. Pat. No. 5,548,053. |
| R3 | $(R_3SiO_{1/2})_{0.43}(SiO_{4/2})_{0.57}(ZO_{1/2})_{0.13}$ where R is methyl, Z is a approximately 90:10 mole ratio of hydrogen and isopropyl, having a Mw of approximately 29,500. | Prepare as described in U.S. Pat. No. 2,676,182, U.S. Pat. No. 3,627,851, U.S. Pat. No. 3,772,247, U.S. Pat. No. 8,017,712 and U.S. Pat. No. 5,548,053. |
| Polyoxyalkylene Polymer | | |
| P1 | $HO(EO)_{310}(PO)_{63}OH$ random copolymer having a number average molecular weight of approximately 17,000 Daltons. | UCON ™ Lubricant 75-H-90,000 from TDCC. |
| P2 | $CH_3CH_2CH_2CH_2$—$(EO)_{146}(PO)_{21}OH$ predominately random copolymer having a number average molecular weight of approximately 8,000 Daltons. | Prepare as described below. |
| Solvents | | |
| S1 | D-limonene (boiling point of 176° C.) | Fisher Scientific Co. |
| S2 | 3-carene (boiling point of 170-172° C.) | Fisher Scientific Co. |
| S3 | Camphene (boiling point of 159° C.) | Fisher Scientific Co. |
| S4 | γ-terpinene (boiling point of 183° C.) | Fisher Scientific Co. |
| S5 | α-pinene (boiling point of 156° C.) | Fisher Scientific Co. |
| S6 | n-heptane (boiling point of 98.4° C.) | Fisher Scientific Co. |
| S7 | p-cymene (boiling point of 177° C.) | Fisher Scientific Co. |
| Condensation Catalysts | | |
| Z1 | Titanium (IV) (triethanolaminato)isopropoxide solution (80% in isopropanol) | TYZOR ™ TE Organic Titanate from Dorf Ketal Chemicals. |
| Z2 | 45% (w/w) potassium hydroxide in water | Fisher Scientific Co. |
| Z3 | Sodium acetate, anhydrous | Fisher Scientific Co. |
| C1 | Secondary alcohol ethoxylate of the general chemical structure: $C_nH_{(2n+1)}(OCH_2CH_2)_9OH$ where n is in a range of 11-15. | TERGITOL ™ 15-S-9 Surfactant from TDCC. |
| C2 | Butanol initiated EO/PO random copolymer having the following general chemical structure: $CH_3CH_2CH_2CH_2(OCH_2CH_2)_{15}(OCH_2CH(CH_3))_9OH$ | UCON ™ Lubricant 50-HB-400 from TDCC. |
| C3 | $CH_3O(CH_2CH_2O)_{11}CH_3$ | Polyethylene glycol dimethyl ether 500 from Sigma Aldrich |
| C4 | $(Me_2SiO_{1/2})(Me_2SiO_{2/2})_{60}(MeSi(CH_2CH_2CH_2(OCH_2CH_2)_{18}(OCH_2CH(CH_3))_{18}OAc)O_{2/2})_8(Me_3SiO_{1/2})$ | XIAMETER ™ OFX-5330 Fluid from TDCC. |
| C5 | $CH_3CH(OH)CH_2OCH_2CH(OH)CH_3$ | Dipropylene glycol LO+ from TDCC. |
| Binder | | |
| V1 | Aliphatic polyurethane/polycarbonate dispersion | PERMUTEX ™ RU-13-085 Binder from Stahl Polymers. |

Prepare A2 in the following manner:

In a DAC 500 FVZ SpeedMixer™ cup, 401.44 grams of A1 (XIAMETER™ RBG-0910 Gum) and 0.48 grams of 1,2,2,4-tetramethyl-1-aza-2-silacyclopentane were added and mixed 5 times for 30 seconds each time at 2350 RPM. The content was let cool for 15 minutes between mixes. After the mixing, the content was placed in a 70° C. oven for 12 hours.

Prepare P2 in the following manner:

Charge a 500 milliliter (mL) round bottom flask with 233.58 grams (g) diglyme (diethylene glycol dimethyl ether, Aldrich, anhydrous 99.5%), 18.04 g of triethylene glycol butyl ether, and 1.96 g of 50% aqueous potassium hydroxide. Fit the flask with a temperature controlled heating mantle, six plate vacuum jacketed and silvered Oldershaw column, and water cooled reflux/distillation head. Apply vacuum using a dry ice protected Edwards vacuum pump. Heat the light yellow solution under vacuum of 7 torr to a pot temperature of 60 to 65° C. to collect 25.34 g of distillate at a head temperature of 30 to 52° C. Cool the solution under vacuum and then release the vacuum with nitrogen to achieve a light yellow solution.

Charge a conical bottom 2-liter (L) Parr reactor with the light yellow solution. Seal the reactor, pressure check it, purge with nitrogen and then heat to 120° C. Add 618.6 g of ethylene oxide mixed with 204.5 g of propylene oxide at an addition rate of 2 grams per minute for 220 minutes, then one gram per minute for 370 minutes. Hold the mixture overnight at 120° C., then cool to 60° C. Purge the headspace for 15 minutes and then unload 1013.53 g of reaction product. Mix the reaction product with 1.05 g of acetic acid. Filter the product to a nominal particle size of 0.45 micrometers and isolate from diglyme by rotary evaporation at 120° C. under reduced pressure of 5 millimeters mercury to achieve polyoxyalkylene "P2".

Preparation of Condensation Products

Table 7 lists the components used to prepare each of Condensation Products B1-B16. The table lists the component and the mass used in grams unless otherwise noted in the table.

Prepare Condensation Products B1-B16 using a reactor consisting of a three-necked round-bottom flask equipped with a polytetrafluoroethylene stir paddle on a glass stir shaft, a thermocouple, and a Dean-Stark trap pre-filled with solvent connected to a water-cooled condenser and a nitrogen purge. Dissolve polysiloxane resin component (R) into the reaction solvent (S components) and then add polyoxyalkylene polymer (P) while mixing. After 10 minutes add reaction catalyst (Z). Heat to achieve a vigorous reflux and collect water in the Dean-Stark trap. After the prescribed reaction time, deactivate the catalyst by chemical neutralization. Cool the product below 50° C. and then filter through a filter having 5 micrometers nominal pore size. Cool to 25° C.

Measure Percent Transmittance (% T) for each Condensation Product using a Milton Roy Spectronic 21 spectrophotometer tuned to 580 nanometers wavelength. Prepare a blank sample consisting of 18.2 mega-ohm*centimeter water in a cuvette compatible with the Milton Roy Spectronic 21 spectrophotometer. Use this blank to set the spectrophotometer to 100% Transmittance (100% T). For the samples, fill a cuvette at least 80% full by volume. Collect transmittance measurements at 580 nanometers to determine % T of the sample. Between each sample check the baseline transmittance with the blank sample and adjust the baseline to 100% T as needed.

Preparation of Composition Samples (Slip Additives) X1-X20

Table 8 lists formulations for the Composition Samples X1-X20 with the components and their amounts in grams (g), the method of preparation, the amount of aromatic solvent in the final product (in weight parts per million (ppm) based on composition weight), and the average particle size of the polyorganosiloxane in the composition in micrometers (μm). Determine the amount of aromatic solvent and average polyorganosiloxane particle size for the Composition Samples as described previously herein.

The first step in preparing the Composition Samples is to charge the indicated amount of Condensation Product (B) and non-aqueous polar fluid (C) to a rotary evaporator flask. Remove reaction solvent(s) to a concentration of less than 3 wt % based on mixture weight by rotary evaporation at less than 1.3 kiloPascals (10 millimeters mercury) pressure at 105° C. Use the specified amount of the resulting mixture ("Component B+C") in one of the following methods as specified in Table 8.

Method 1. Prepare Composition Samples X1-X13 and X16-X20 using a SpeedMixer™ DAC 150 FVZ series from FlackTek Inc. Add to a Max-60 cup fit for use with the DAC 150 FVZ mixer the specified amount of polyorganosiloxane (A), 8 g of glass beads from Fisher Scientific (11-312A), and the specified amount of a condensation Component B+C, prepared as described just prior above. Cap the cup and spin the sample in the mixer at 3500 revolutions per minute (RPM) for 2 minutes. Cool the sample to 25° C. and then spin again at 3500 RPM for one minute. Add 11.5 grams of water in up to 10 incremental steps, each followed by spinning the sample in the mixer for 30 seconds. Separate out the glass beads by decanting off the liquid phase to obtain the Composition Sample.

Method 2. Prepare Composition Sample X15 using a Ross VMC-1 mixer from Charles Ross & Sons Company. Add to a stainless steel vessel the specified amount of Component B+C. Add 565 g of polyorganosiloxane (A1). Mix the contents for 10 minutes at 1020 RPM for the disperser and 35 RPM for the scraper. Add another 451 g of the polyorganosiloxane (A1) followed by mixing under the same conditions for 50 minutes. Add 618 g of water in three incremental steps, each followed by mixing until a homogeneous dispersion is achieved. The homogeneous dispersion is Composition Sample X15.

Method 3. Prepare the Composition Sample X14 using a Myers VL550 10-liter mixer equipped with two cowles disperser mixing blades from Myers Mixers, LLC. Add to a stainless-steel vessel 1460.0 g of the Component B+C and 2,260 g of polyorganosiloxane A1. Mix the components for 10 minutes at 500 RPM for the dual disperser and 60 RPM for the scraper. Add another 1,808 g of polyorganosiloxane A1. Mix under the same conditions for 90 minutes. Add 2,476 g of water at a rate of 500 g per minute, followed by mixing until a homogeneous dispersion is achieved (approximately 40 minutes). The homogeneous dispersion is Composition Sample X14.

TABLE 7

| Condensation Product | Polysiloxane Resin | Reaction Solvent(s) | Polyoxyalkylene Polymer | Catalyst | Reflux Temperature (° C.) | Reaction Time (hours) | % T of Product |
|---|---|---|---|---|---|---|---|
| B1 | R1 (50.1) | S1 (304.6) | P1 (100.2) | Z1 (86 μL) | 179.0 | 7 | 99 |
| B2 | R1 (66.0) | S1 (341.8) S6 (60.3) | P1 (132.5) | Z1 (114 μL) | 152.5 | 5 | 89 |
| B3 | R1 (66.0) | S1 (402.0) | P1 (133.0) | Z2 (302 μL) | 177.5 | 5 | 96 |
| B4 | R1 (66.0) | S1 (404.2) | P1 (132.7) | Z3 (0.29 g) | 177.9 | 5 | 99 |
| B5 | R1 (50.1) | S5 (304.6) | P1 (100.2) | Z1 (86 μL) | 157.7 | 7 | 87 |
| B6 | R1 (50.1) | S5 (300.1) | P1 (100.0) | -- none -- | 159.0 | 5 | 89 |
| B7 | R1 (50.1) | S2 (304.7) | P1 (101.2) | Z1 (86 μL) | 175.0 | 7 | 94 |
| B8 | R1 (50.1) | S4 (304.6) | P1 (100.2) | Z1 (86 μL) | 184.4 | 7 | 96 |
| B9 | R1 (25.0) | S1 (152.4) | P2 (50.0) | Z1 (43 μL) | 177.0 | 5 | 91 |
| B10 | R3 (37.5) | S1 (304.6) | P1 (112.7) | Z1 (86 μL) | 178.9 | 4 | 83 |
| B11 | R2 (37.6) | S1 (305.1) | P1 (112.7) | Z1 (86 μL) | 178.8 | 6 | 92 |
| B12 | R1 (66.1) | S7 (402.0) | P1 (133.2) | -- none -- | 180.0 | 5 | 14 |
| B13 | R1 (50.6) | S3 (319.4) | P1 (100.3) | Z1 (86 μL) | 156.1 | 5 | 83* |
| B14 | R1 (330.1) | S1 (2010.0) | P1 (660.1) | Z1 (569 μL) | 176.9 | 7 | 91 |
| B15 | R1 (300.0) | S1 (1827.3) | P1 (600.4) | Z1 (26 μL) | 176.8 | 6 | 96 |
| B16 | R1 (363.1) | S1 (2211.1) | P1 (727.4) | Z1 (32 μL) | 176.8 | 18 | 97 |

*B13 % T was obtained by first melting the sample at 55° C. because it is solid at 25° C. Other % T values are collected at 25° C. because they are liquid at that temperature.

TABLE 8

| Composition Sample | B Component Used | C Component Used | B + C Component | Polyorganosiloxane (A) | Water | Method | Aromatic Solvent (ppm) | Average Particle Size (μm) |
|---|---|---|---|---|---|---|---|---|
| X1 | B1 (151.0) | C3 (97.6) | 6.24 | A1 (17.50) | 11.27 | 1 | 0.3 | 2.9 |
| X2 | B2 (250.0) | C1 (159.2) | 6.26 | A1 (17.52) | 11.20 | 1 | 0.3 | 7.0 |
| X3 | B3 (252.8) | C1 (156.9) | 6.25 | A1 (17.51) | 11.24 | 1 | 0.3 | 5.3 |
| X4 | B4 (258.8) | C1 (161.7) | 6.27 | A1 (17.47) | 11.23 | 1 | 0.3 | 1.9 |
| X5 | B5 (161.7) | C1 (93.6) | 6.26 | A1 (17.50) | 11.25 | 1 | 0.3 | 3.2 |
| X6 | B6 (191.6) | C1 (115.6) | 6.25 | A1 (17.49) | 11.29 | 1 | 0.3 | 6.4 |
| X7 | B7 (152.9) | C1 (101.6) | 6.25 | A1 (17.50) | 11.24 | 1 | 0.3 | 3.2 |
| X8 | B8 (254.6) | C1 (156.9) | 6.25 | A1 (17.49) | 11.25 | 1 | 0.3 | 2.2 |
| X9 | B9 (166.5) | C1 (101.5) | 6.25 | A1 (17.52) | 11.21 | 1 | 0.1 | 7.5 |
| X10 | B10 (259.7) | C1 (156.5) | 6.25 | A1 (17.50) | 11.25 | 1 | 0.2 | 6.0 |
| X11 | B11 (250.5) | C1 (158.2) | 6.24 | A1 (17.51) | 11.25 | 1 | 0.2 | 18.6 |
| X12 | B12 (550.5) | C1 (338.3 | 6.25 | A1 (17.50) | 11.25 | 1 | 39.3 | 5.6 |
| X13 | B13 (178.3) | C1 (113.6) | 7.03 | A1 (17.49) | 10.54 | 1 | 0.3 | 8.9 |
| X14 | B14 (2209.3) | C1 (1437.8) | 1460.0 | A1 (4068.0) | 2476.0 | 3 | 0.3 | 3.1 |
| X15 | B14 (1262.6) | C1 (803.6) | 365.0 | A1 (1016.0) | 618.0 | 2 | 0.3 | 3.4 |
| X16 | B15 (1364.6) | C2 (887.7) | 6.26 | A3 (17.52) | 11.24 | 1 | 0.3 | 2.0 |
| X17 | B15 (1364.6) | C2 (887.7) | 6.26 | A2 (17.48) | 11.31 | 1 | 0.3 | 1.8 |
| X18 | B16 (209.1) | C4 (140.5) | 6.27 | A1 (17.50) | 11.24 | 1 | 0.3 | 13.5 |
| X19 | B16 (117.2) | C5 (78.8) | 6.26 | A1 (17.51) | 11.26 | 1 | 0.3 | 2.1 |
| X20 | B15 (1364.6) | C2 ( 887.7) | 6.26 | A1 (17.51) | 11.28 | 1 | 0.3 | 3.2 |

Residual Monoterpene In X1-X20

Monoterpene is present in each of X1-X20 as is qualitatively evident by the ability to smell the monoterpene in each of X1-X20. Monoterpenes, in general, are reported to have an odor threshold in a range of 0.1-10 ppm concentration (see, for example, H. Tamura et al., Food Sci. Technol. Res., 7(1), 72-77, 2001; L. Molhave et al, Indoor Air 2000; 10:315-318 (2000)). In particular, limonene has a reported odor threshold of 0.20 ppm, α-pinene has a reported odor threshold of 0.19 ppm. 3-carene has a reported odor threshold of 5.6 ppm. Camphene has a reported odor threshold of 0.88 ppm. γ-terpinene has a reported odor threshold of 0.26 ppm.

The amount of monoterpene in the Composition Samples was quantitatively evaluated for a Composition Sample containing each of the different monoterpenes. These Composition Samples are expected to be representative of the amount of monoterpene present in the other Composition Samples having the same monoterpene, except Composition Sample X20, which has an intentionally high concentration of monoterpene as discussed below. To evaluate the amount of monoterpene in the Composition Samples, use the gas chromatography method stated below to measure the amount of monoterpene in the Condensation Product used to make the Composition Sample and then reduce that measured amount by the dilution factor for how much Condensation Product is in the Composition Sample. Results are in Table 9, with concentration of monoterpene reported in weight parts monoterpene per million weight parts of Composition Sample (ppm).

Gas chromatography method for measuring monoterpene. Use a gas chromatograph with mass spectrometry and flame ionization dual detection (GC/MS). Dilute analyte 1:4 (w/w) into acetone with a known amount of undecane internal standard by shaking at 25° C. until dispersed, or until 2 hours have passed whichever occurs first. Centrifuge the sample and collect the top, clear layer. Analyze the solution using the GC/MS under the following conditions: apply a one-microliter injection of analyte solution at the inlet, which is maintained at a temperature of 250° C., and split to a 50:1 ratio with helium carrier gas flowing ate 1.5 milliliters per minute. Separation occurs in a DB 1-30 meter by 0.25 millimeters by 0.1 micrometer film column under a temperature gradient ranging from 50° C. to 300° C. at a rate of 15° C. per minute. Identify peaks of interest by mass spectrometry. Interpret data for peaks of interest from the flame-ionization detector. Quantify monoterpene content relative to the undecane internal standard.

TABLE 9

| Composition Sample | Monoterpene | Concentration of Monoterpene (ppm) |
|---|---|---|
| X6 | α-pinene | 9 |
| X7 | 3-carene | 29 |
| X8 | γ-terpinine | 14 |
| X13 | camphene | ≥0.88 and <10* |
| X16 | D-limonene | 138 ppm |

*The monoterpene could be smelled in the Composition Sample so it is present at or above the odor threshold but could not be detected by gas chromatography in the Condensation Product used to make the Composition Sample. Therefore, the monoterpene is present below the GC detection threshold of 50 ppm in the Condensation Product, which correlates to less than 10 ppm in the Composition Sample.

Preparation of Prior Art Composition Samples (Slip Additives) X21 and X22

Composition Samples X21 and X22 illustrate dispersion of polyorganosiloxane gum from prior art references. X21 corresponds to example 2 of US8877923. Composition Sample X22 corresponds to example 1 of WO2016014609.

Composition X21. To a Max-100 cup fit for use with a DAC 150 FVZ SpeedMixer™ (SpeedMixer is a trademark of FlackTek, Inc.) add 35 g polyorganosiloxane A1, 16 g of 3 millimeter diameter spherical glass beads (Fisher Scientific) and 7 g of surfactant (poly(ethylene glycol)-block-poly (propylene glycol)-block-poly(ethylene glycol)) having a number average molecular weight of approximately 14,600 Daltons, available as PLURONIC™ F-108 from BASF Corporation (PLURONIC is a trademark of BASF Corporation). Close the cup and place into the mixer and spin at 3450 RPM for 3 minutes. Open the cup and stir the contents with a spatula. Close the cup and spin on the mixer for an additional one minute at 3450 RPM. Dilute the resulting mixture with 28 g of deionized water in four increments (3 g, 5 g, 8 g and 12 g) with each addition followed by spinning the cup for 30 seconds at 3450 RPM. The resulting mixture consists of an oil-in-water emulsion of the polyorganosiloxane in water and has a silicone content to 50 wt % relative to the total emulsion weight. The polyorganosiloxane has an average particle size of 3.05 micrometers.

Composition X22. To a Max-100 cup fit for use with a DAC 150 FVZ SpeedMixer™ (SpeedMixer is a trademark of FlackTek, Inc.) add 50 g polyorganosiloxane A1 and 10 g of a water-soluble branched silicone polyether having a nominal formula weight of 28,000 g/mol (DOWSIL™ OFX-5247 Fluid from The Dow Chemical Company). Mix the contents of the cup in the mixer for 60 seconds at 2500 RPM. Repeat the mixing two more times at 3000 RPM. Add 40 g of water in three increments, each addition followed by mixing for 60 seconds at 3000 RPM in the same mixer. The resulting mixture is a white oil-in-water emulsion having an average polyorganosiloxane particle size of 6.88 micrometers.

Compound Solvent Stability Evaluation

Characterize compounds X1-X22 for solvent stability in the presence of the following coalescent solvents: propylene glycol, dipropylene glycol methyl ether (DOWANOL™ DPM Glycol Ether from The Dow Chemical Company), butyl glycol, propylene glycol n-butyl ether (DOWANOL™ PnB Glycol Ether), dipropylene glycol n-butyl ether (DOWANOL™ DPnB Glycol Ether from The Dow Chemical Company), and ester alcohol (TEXANOL™ Ester Alcohol from Eastman Chemical).

For each solvent, dilute a sample of the Compound X1-X22 by adding into a glass vial 5 weight-parts deionized water and one weight-part solvent. Shake the vial to mix the contents. Add one weight-part of the Compound and shake to mix. Allow the vial to set for 24 hours and then visually observe the vial contents and characterize the status of the dispersion: STABLE=no visible phase separation; PHASE SEPARATED=visible polyorganosiloxane chunks phase separated out of the emulsion.

NOTE: Creaming may develop during the characterization and is not considered phase separation. Emulsions become less viscous in water and solvent and may result in creaming Creaming refers to emulsion droplets diffusing to the top of the mixture as a result of gravitation. Silicone is of lower density than the aqueous-solvent solution. Creaming differs from phase separation as no droplets are fused together to form larger ones. A Compound evaluate for solvent stability is "STABLE" even if creaming is present so long as visible polyorganosiloxane chunks that phase separate out from the emulsion are absent.

RESULTS: Each of X1-X20 are STABLE in each of the six solvents. X21 is PHASE SEPARATED in Butyl Glycol. X22 PHASE SEPARATED in propylene glycol n-butyl ether, dipropylene glycol n-butyl ether, and ester alcohol.

Coating Samples and Evaluation

Prepare three coatings, one without a Compound to act as a slip additive (Reference), one with X14 and one with X15.

For the Reference coating sample, use as a coating composition the polyurethane dispersion binder (V).

For the coating samples including X14 and X15, combine into a 100 mL glass beaker 10 g of deionized water and 5 g of isopropyl alcohol. Mixing using a metal spatula. In a 250 mL glass beaker add 50 g of X14 or X15 and 35 g of deionized water and mix for 5 minutes using an IKA stirrer equipped with a standard 3 upper pitched blade at 800 RPM. Add the contents of the 100 mL beaker in to the 250 mL beaker while mixing. In a third beaker, a 100 mL glass beaker, add 18 g of a polyurethane dispersion binder (V) and 2 g of the contents from the 250 mL beaker. Mix the contents of the third beaker with a wooden spatula for one minute with moderate agitation to obtain a coating formulation.

Apply each of the coating samples onto both polyester and leather substrates. For the Polyester substrate, apply a 60 micrometer thick coating onto a clear polyester plastic film using a gap applicator from BYK. Dry the coating in a vented oven at 80° C. for 2 minutes. For the Leather substrate, apply two layers, each 34 micrometers thick, onto pre-treated cow leather (black, size A4 from FILK GmbH) using a gap applicator from BYK. Dry the first layer for 2 minutes at 80° C. in a vented oven prior to applying the second layer. Dry the second layer for 2 minutes at 80° C. in a vented oven.

Characterize the Reference, X14 and X15 coatings with the following evaluations:

Appearance. Evaluate the compatibility of the Compound and binder on the polyester film from the appearance of the coating on the polyester film. Appearance is assigned a value of 1-5 with 1 being defect free and 5 corresponding to roughly half of the area being defective due to craters. A value of 1-3 is acceptable.

Abrasion Resistance. Follow ISO 17076-1:2012 method to characterize the abrasion resistance of the coating on the leather substrate using Table method CS-10 wheel with 1 kg weight. Report the number of cycles the leather endures before visible wear is observed. A higher number corresponds to greater abrasion resistance and is desirable.

Wet Rub Resistance. Follow ISO 26082-1 method to characterize wet rub resistance of the coating on the leather substrate using Martindale. Assign numbers according the test method in values of ΔE. Lower values are desirable.

Coefficient of Friction (CoF) and Anti-Squeak Measurement. Follow VDA 230-206 method to determine coefficient of friction and anti-squeak performance for the coating on leather substrates. For the CoF use SSP-04 Test Bench from Ziegler Instruments. For Anti-Squeak, a value of 1-3 indicates no stick-slip is encountered and that audible noise is not expected. A valued of 4-5 indicates that stick-slip problems are possible, and that audible interference cannot be eliminated. A value of 6-10 indicates that stick-slip problems will occur and that audible noise during relative movements is expected. Low values for both CoF and anti-squeak are desirable.

Table 9 presents results for the three coating formulations.

TABLE 9

| Coating Sample | Appearance | CoF | Anti-Squeak | Abrasion Resistance | Wet Rub Resistance |
|---|---|---|---|---|---|
| Reference | 1 | 1.095 | 1 | 500 | 45 |
| Reference + X14 | 2 | 0.085 | 1-3 | 1800 | 1.3 |
| Reference + X15 | 2 | 0.089 | 1-4 | 2000 | 1 |

DATA ANALYSIS

Condensation Products

Condensation Products B1, B3-B11 and B13-B16 illustrate condensation products successfully prepared in various monoterpene reaction solvents and with various polyoxyalkylene polymers, wherein each Condensation Product is clear (% T greater than 70%).

Condensation Product B2 illustrates a condensation product successfully prepared in a reaction solvent that is a blend of monoterpene and n-heptane that is also clear.

Condensation Product B12 illustrates a condensation product prepared in aromatic reaction solvent of p-cymene, which has a similar chemical structure to 7-terpinene (S4, used in B8) in structure but with an aromatic ring. Despite being structurally similar to the monoterpene the p-cymene generated a hazy Condensation Product with only 14% T.

B10 and B11 illustrate Condensation Products made with high and low molecular weight Polysiloxane resins, and lower than typical Resin to Polyoxyalkylene Polymer ratio than typical.

B9 illustrates a Condensation Product made with a monofunctional Polyoxyalkylene Polymer as opposed to a difunctional Polyoxyalkylene Polymer.

B5 and B6 illustrate similar formulations one using condensation catalyst and one without using condensation catalyst.

B3 and B4 illustrate similar formulations made using different condensation catalysts.

Composition Samples

Composition Samples X1-X11 and X13-X20 illustrate that compositions of the present invention can be made from Condensation Product made in a variety of monoterpene reaction solvents represented by Condensation Products B1-B11 and B13-B16; that the monoterpene reaction solvent can be removed under mild conditions to a level of 3 wt % monoterpene or less based on weight of Condensation Product and non-aqueous polar fluid; that the Composition has less than one ppm aromatic solvent based on Composition weight; and that the Composition has an average polyorganosiloxane particle size in the range of 0.5 to 20 micrometers.

Composition X20 illustrates a composition with a relatively high concentration of monoterpene. The sample retains approximately 10 wt % monoterpene based on the combined weight of Condensation Product and Non-Aqueous Fluid, which translates into approximately 1.8 wt % relative to Composition Sample weight. Sample X20 still retains less than one ppm aromatic solvent based on Composition Sample weight and has an average polyorganosiloxane particle size in the range of 0.5 to 20 micrometers.

Sample X12 reveals that using an aromatic reaction solvent similar to γ-terpinene results in a Composition Sample with nearly 40 ppm aromatic solvent when stripped in a similar mild manner as the monoterpene reaction solvents, demonstrating an inability to easily remove the aromatic solvent even when it appears similar to a monoterpene.

Each of the Composition Samples made using Condensation Product made in monoterpene reaction solvent demonstrated solvent stability to all six solvents tested. In contrast, prior art Composition Samples are not solvent stable in all six solvents.

Coating Formulations

Coating formulations made using Composition Samples of the present invention illustrate the Composition Samples of the present invention impart desirable properties as slip additives to coating formulations.

What is claimed is:

1. A composition comprising a dispersion comprising:
(a) a polyorganosiloxane comprising at least 90 mole-percent dimethyl D units and having a viscosity of one kilopascal*second or more at 25 degrees Celsius, the polyorganosiloxane being in the form of particles having an average size of 0.5 to 20 micrometers;
(b) a condensation product of:
(i) a polysiloxane resin having a weight-average molecular weight of 4,000-50,000 and having the following composition:

$(R_3SiO_{1/2})_a(SiO_{4/2})_b(ZO_{1/2})_c$ where subscripts a, b and c are molar equivalents of the associated molecular unit, a is 0.30-0.60, subscript b is 0.40-0.70, subscript c is 0.05-0.20, the sum of subscripts a and b is one, R is independently in each occurrence selected from a group consisting of hydrogen, $C_{1-30}$ alkyl groups and aryl groups, and Z is independently in each occurrence selected from a group consisting of H, and $C_1$-$C_8$ alkyls; and
(ii) a polyoxyalkylene polymer having a number average molecular weight of 4,500 Daltons or more and at the same time 50,000 Daltons or less and having the following composition:

$A—O—(C_2H_4O)_e(C_3H_6O)_p—A'$ where the ratio e/p is greater than one and less than 9, A and A' are independently selected from a group consisting of hydrogen, alkyl, substituted alkyl, aryl, and substituted aryl groups provided that at least one of A and A' is H;
(c) a non-aqueous fluid carrier that is miscible with the polyoxyalkylene polymer; and
(d) a monoterpene;
wherein the weight-ratio of non-aqueous fluid carrier (c) to condensation product (b) is 0.5 or more and 10 or less; the weight-ratio of the combination of condensation product (b) and non-aqueous fluid carrier (c) to polyorganosiloxane (a) is 0.01 or more and 0.50 or less; and the composition contains less than one weight-part aromatic solvent per million weight parts composition.

2. The composition of claim 1, wherein the monoterpene is present at a concentration of 3 weight-percent or less based on composition weight.

3. The composition of claim 1, wherein the monoterpene is any one or any combination of more than one monoterpene selected from a group consisting of D-limonene, 3-carene, camphene, γ-terpinene, and α-pinene.

4. The composition of claim 1, wherein both the condensation product (b) and the composition are free of tin catalyst.

5. The composition of claim 1, further comprising a binder.

6. The composition of claim 1, wherein the polyorganosiloxane has a terminal amine functionality.

7. A method for preparing the composition of claim 1, the method comprising the steps of:
(a) preparing a condensation product by conducting a condensation reaction in monoterpene reaction solvent, where the condensation reaction is run in the presence of less than one weight-percent aromatic solvent, where the condensation reaction is between:
(i) a polysiloxane resin having a weight-average molecular weight of 4,000-50,000 and having the following composition:

$(R_3SiO_{1/2})_a(SiO_{4/2})_b(ZO_{1/2})_c$ where subscripts a, b and c are molar equivalents of the associated molecular units, a is 0.30-0.60, subscript b is 0.40-0.70, subscript c is 0.05-0.20, the sum of subscripts a and b is one, R in each occurrence is selected from a group consisting of hydrogen, $C_{1-30}$ alkyl groups and aryl groups, and Z is in each occurrence selected from a group consisting of H, and $C_1$-$C_8$ alkyls; and
(ii) a polyoxyalkylene polymer having a number average molecular weight of 4,500 Daltons or more and at the same time 50,000 Daltons or less and having the following composition:

$A—O—(C_2H_4O)_e(C_3H_6O)_p—A'$ where the value of e/p is greater than one and less than 9, A and A' are independently selected from a group consisting of hydrogen, alkyl, substituted alkyl, aryl, and substituted aryl groups provided that at least one of A and A' is H;

(b) adding to the condensation product a non-aqueous fluid carrier that is miscible with the polyoxyalkylene polymer to form a mixture;

(c) after step (a) and before step (d), removing monoterpene reaction solvent to a concentration of less than 10 weight-percent relative to condensation reaction product weight; and (d) dispersing into the mixture of step (c) a polyorganosiloxane comprising at least 90 mole-percent dimethyl D units and having a viscosity of one kiloPascal*second or more at 25 degrees Celsius under shear to produce a dispersion of polyorganosiloxane particles having an average size of 0.5 to 20 micrometers dispersed in the mixture of step (c) to form a composition;

wherein: the weight-ratio of non-aqueous fluid carrier added in step (b) to condensation product prepared in step (a) is 0.5 or more and 10 or less; the weight-ratio of the combination of condensation product prepared in step (a) and non-aqueous fluid carrier added in step (b) to polyorganosiloxane dispersed in step (d) is 0.01 or more and 0.5 or less; composition contains less than one weight-part aromatic solvent per million weight parts composition; and the composition comprises monoterpene.

8. The method of claim 7, wherein the condensation reaction is run in the presence of less than five weight-parts aromatic solvent per million weight parts combined weight of polysiloxane resin, polyoxyalkylene polymer and monoterpene reaction solvent.

9. The method of claim 7, wherein the monoterpene reaction solvent in step (a) is present at a concentration of 50 weight-percent or more based on the combined weight of polysiloxane resin, polyoxyalkylene polymer and monoterpene reaction solvent.

10. The method of claim 7, wherein the monoterpene reaction solvent comprises one or more than one monoterpene and up to 25 weight-percent a non-aromatic hydrocarbon based on monoterpene reaction solvent weight, wherein the non-aromatic hydrocarbon is selected so as to provide a monoterpene reaction solvent that has a lower boiling point than the monoterpene component(s) alone at 101 kiloPascals pressure.

* * * * *